United States Patent [19]

Ando

[11] 4,449,138

[45] May 15, 1984

[54] INFORMATION RECORDING MEDIUM

[75] Inventor: Hideo Ando, Tokyo, Japan

[73] Assignee: Tokyo Shibaura Denki Kabushiki Kaisha, Kawasaki, Japan

[21] Appl. No.: 368,088

[22] Filed: Apr. 13, 1982

[30] Foreign Application Priority Data

| Apr. 15, 1981 | [JP] | Japan | 56-56718 |
| Apr. 15, 1981 | [JP] | Japan | 56-56719 |
| Apr. 16, 1981 | [JP] | Japan | 56-57552 |
| Apr. 16, 1981 | [JP] | Japan | 56-57553 |
| Apr. 17, 1981 | [JP] | Japan | 56-57890 |
| Apr. 20, 1981 | [JP] | Japan | 56-59537 |

[51] Int. Cl.$^3$ .............................. G01D 15/34
[52] U.S. Cl. ................. 346/135.1; 346/76 L
[58] Field of Search ............ 346/1.1, 135.1, 76 L, 346/137; 358/297; 428/913, 156; 430/945

[56] References Cited

U.S. PATENT DOCUMENTS

| 3,665,483 | 5/1972  | Bocker et al. | 346/1.1     |
| 4,074,282 | 2/1978  | Balas et al.  | 346/137 X   |
| 4,179,532 | 12/1979 | Soeding       | 346/135.1 X |
| 4,264,911 | 4/1981  | Wilkinson     | 346/135.1   |
| 4,300,143 | 11/1981 | Bell et al.   | 346/135.1   |
| 4,313,190 | 1/1982  | Slaten        | 346/135.1 X |
| 4,370,391 | 1/1983  | Mori et al.   | 346/137 X   |

Primary Examiner—Donald A. Griffin
Attorney, Agent, or Firm—Cushman, Darby & Cushman

[57] ABSTRACT

Disclosed is an information recording medium, comprising a pair of disk-shaped substrates disposed apart from each other; protective layers each formed on the inner surface of the substrate; and optical information recording layers each consisting of an energy-absorbing layer or light reflective layer and formed on the protective layer. The clearance between the mutually facing recording layers may be filled with an adhesive layer. Also, the protective layer, which serves to prevent water or oxygen from entering the recording layer, may be formed on the outer surface of the substrate.

20 Claims, 13 Drawing Figures

INFORMATION RECORDING MEDIUM

BACKGROUND OF THE INVENTION

This invention relates to an information recording medium. The information recording medium has an optical information recording layer. A laser beam is focused on the recording layer to form a pit therein, thereby recording optical information. The optical information recorded in this fashion can be read out. Alternatively, the information recording medium has a light reflective layer having optical information recorded therein in the form of, for example, patterned recesses and projections. A laser beam is focused on the reflective layer so as to read out the recorded information from the light reflected from the reflective layer.

Recently, the information recording medium permits a high density recording. For example, the recording density achieved nowadays is scores of times to one hundred times as high as that of a magnetic memory. Specifically, the information can be recorded at a track width of 1 μm or less and a track pitch of 2 μm or less and the information recorded at such a high density can be reproduced. Also, a single disk, 30 cm in diameter, of the information recording medium permits achieving a capacity of 50,000 tracks and $10^{10}$ bits. The information recording medium produces additional merits including the following:

1. Information can be recorded and reproduced in a non-contact fashion,
2. Random access is permitted at a high speed,
3. The medium can be preserved stably for a long period of time,
4. Recording system is simple,
5. Additional information can be recorded, and
6. The cost per bit is low.

Because of these merits, the information recording medium is widely used for the information recording-reproducing purpose or for the reproducing purpose alone. The information recording medium for the reproducing purpose alone is used in, for example, a domestic video disk, a video disk for business, and an audio PCM disk. On the other hand, the information recording medium for the recording-reproducing purpose is used in, for example, a document file, a video file and a computer general purpose memory.

The conventional information recording medium used in an information processing device of this type comprises two substrates each formed of, for example, a transparent plastic plate. Formed directly on one surface of each substrate is an optical information recording layer consisting of an energy-absorbing layer or a light reflective layer. The two substrates of this construction are disposed to face each other such that the recording layer is positioned inside, and are bonded to each other with spacers disposed therebetween so as to provide a free space therebetween. Alternatively, the two substrates are directly bonded to each other, with an adhesive coated on the entire surface of at least one substrate.

The conventional information recording medium of the construction described above is defective in that the transparent plastic substrate is high in permeation rate of water or oxygen. Thus, the oxygen or water contained in the atmosphere readily permeates through the substrate to enter the optical information recording layer. It follows that the deterioration of the recording layer is promoted, leading to reductions in the light reflecting rate and light absorbing rate and, thus, to a low sensitivity. In addition, the recording layer tends to peel off the substrate.

SUMMARY OF THE INVENTION

An object of this invention is to provide an information recording medium which permits preventing an early deterioration and peeling of the optical information recording layer and, thus, also permits a stable information processing over a long period of time.

According to one aspect of the present invention, there is provided an information recording medium, comprising a pair of disk-shaped substrates disposed apart from each other; intermediate protective layers each formed on the inner surface of the substrate; and optical information recording layers each consisting of an energy-absorbing layer or light reflective layer and formed on the intermediate protective layer.

According to another aspect of the present invention, there is provided an information recording medium, comprising a pair of disk-shaped substrates disposed apart from each other; intermediate protective layers each formed on the inner surface of the substrate; optical information recording layers each consisting of an energy-absorbing layer or light reflective layer and formed on the intermediate protective layer; and an adhesive layer disposed to fill the clearance between the information recording layers for the bonding purpose.

According to still another aspect of the present invention, there is provided an information recording medium, comprising a pair of disk-shaped substrates disposed apart from each other; optical information recording layers each consisting of an energy-absorbing layer or light reflective layer and formed on the inner surface of the substrate; an adhesive layer filling the clearance between the mutually facing information recording layers for the bonding purpose; and outer protective layers each formed on the outer surface of the substrate.

BRIEF DESCRIPTION OF THE DRAWINGS

FIGS. 2 to 13 show information recording media according to other embodiments of the present invention, wherein FIG. 6 is an oblique view, and each of FIGS. 2 to 5 and 7 to 13 is a partial cross sectional view.

DETAILED DESCRIPTION OF THE PREFERRED EMBODIMENTS

Figure 1:
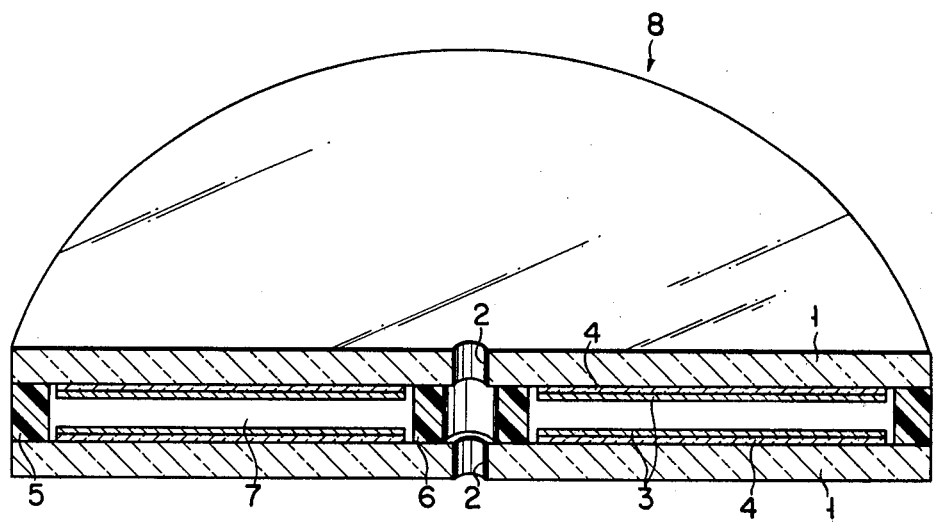
FIG. 1 is an oblique view showing an information recording medium according to one embodiment of the present invention.

FIG. 1 shows a first embodiment of the present invention. As seen from the drawing, the information recording medium comprises a pair of disk-shaped substrates 1, 1 formed of, for example, a transparent plastic plate. A hole 2 is formed through the central portions of the mutually facing substrates 1. The rotary shaft of a turntable included in an information processing device (not shown) is inserted into the hole 2. It is seen that an intermediate protective layer 4 is formed on the inner surface of each substrate 1. Also, an optical information recording layer 3 consisting of an energy-absorbing layer or light reflective layer is formed on the protective layer 4. Further, an annular outer spacer 5 and an annular inner spacer 6 are disposed between the substrates 1 so as to provide a clearance 7 between the mutually facing optical information recording layers 3 and, thus, to form an information recording medium 8. As apparent from the drawing, the outer spacer 5 extends along the outer periphery of the substrate 1. On the other hand, the inner spacer 6 is located near the center of the substrate 1.

The substrate 1 should be at least 0.3 mm thick in order to permit a satisfactory information processing such as reading out of information even if fine dust is attached to the surface. On the other hand, the substrate 1 should be at most 5 mm thick in order to enable a laser beam to be focused satisfactorily by a focusing lens. Specifically, it is desirable to use a transparent acrylic plate having a thickness of 1.0 to 1.5 mm for forming the substrate 1 in view of the mechanical strength, economy, etc.

A thin film of metal such as Te or Al is suitable for use as the optical information recording layer 3. The thin metal film mentioned is formed by, for example, a vacuum vapor deposition.

The intermediate protective layer 4 should desirably be transparent because the writing and reading of information in and from the optical information recording layer 3 are performed through the protective layer 4. In addition, the protective layer 4 should be suitable for playing the role of a binder between the substrate 1 and the recording layer 3 so as to increase the bonding strength of the recording layer 3 to the substrate, and should also be suitable for preventing the oxygen or water within the atmosphere from entering the recording layer 3. To be brief, the protective layer 4 should be formed of a transparent and dense inorganic material.

The inorganic materials forming the intermediate protective layer 4 include, for example, oxides of Zn, Al, Mg, Si, Zr, Ce, Nb, In, Ti and Sn such as $SiO_2$, SiO, $In_2O_3$, $SnO_2$, MgO, ZnO, $Al_2O_3$, $CeO_2$, $TiO_2$, and fluorides of Mg, Ca and Ce such as $MgF_2$, $CaF_2$ and $CeF_3$. For example, a $SiO_2$ layer 500 Å thick may be formed by vacuum vapor deposition so as to provide the protective layer 4.

As described above, the protective layer 4 acts as a binder between the substrate 1 and the recording layer 3 so as to increase the bonding strength of the recording layer 3 to the substrate 1. Thus, even if the substrates 1 are deformed by the external mechanical pressure, leading to collapse of the clearance 7 and, thus, to mutual contact of the recording layers 3, the recording layers 3 are quite unlikely to peel off the substrates 1. Also, the protective layer 4 serves to prevent the oxygen and water permeating through the substrate 1 from entering the recording layer 3. It follows that the recording layer 3 is prevented from an early deterioration and from floating caused by water. Naturally, the information recording medium 8 is enabled to perform a stable information processing for a long period of time. In addition, the medium 8 is high in reliability.

Figure 2:
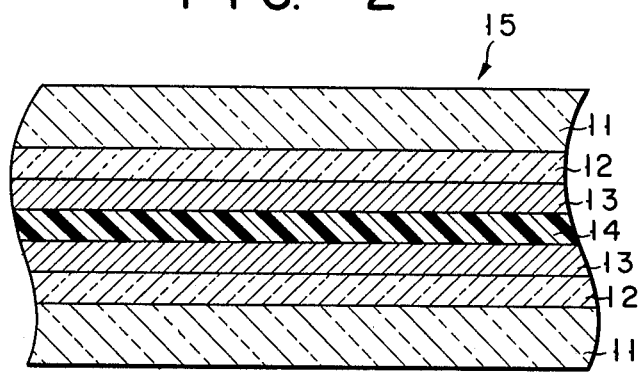

FIG. 2 shows an information recording medium 15 according to a second embodiment of the present invention. It is seen that the medium 15 comprises a pair of transparent substrates 11 equal in material and thickness to the substrates 1 shown in FIG. 1. An intermediate protective layer 12 equal in material to that of the first embodiment is formed on the inner surface of each of the substrates 11. Further, an optical information recording layer 13 consisting of an energy-absorbing layer or light reflective layer is formed on the protective layer 12. The information recording layer mentioned above consists of a thin film of metal such as Te or Al. What should be noted is that the clearance between the mutually facing recording layers 13 is filled with an adhesive layer 14. In other words, the substrates 11 each bearing the protective layer 12 and the recording layer 13 are bonded together such that the recording layers 13 are in direct contact with the adhesive layer 14. Naturally, a hole (not shown) extending through the substrates is formed in the center as in the first embodiment.

The intermediate protective layer 12 should be about 50 to 1,000 Å thick and is formed by vacuum vapor deposition or sputtering of an inorganic material. The optical information recording layer 13 consisting of, for example, Te should be about 500 Å thick and is formed by vacuum vapor deposition. It is desirable to have the protective layer 12 and the recording layer 13 formed in succession under the same vacuum atmosphere. Further, the adhesive layer 14 should desirably be formed of an epoxy series adhesive (Cemedine 1565, trademark) in a thickness of 50 to 300 μm.

As in the first embodiment, the intermediate protective layer 12 consisting of an inorganic material is formed between the substrate 11 and the recording layer 13 in the second embodiment. Thus, oxygen or water is prevented from entering the recording layer. The protective layer 12 also serves to prevent the heat generated from the recording layer 13 in the information recording step from being transmitted directly to the substrate 11. Thus, the substrate 11 is prevented from deformation such as fusion of the surface. Where an oxide of Sn, In or Si is used for forming the protective layer 12, the bonding strength of the recording layer 13 to the substrate 11 is further increased.

Figure 3:
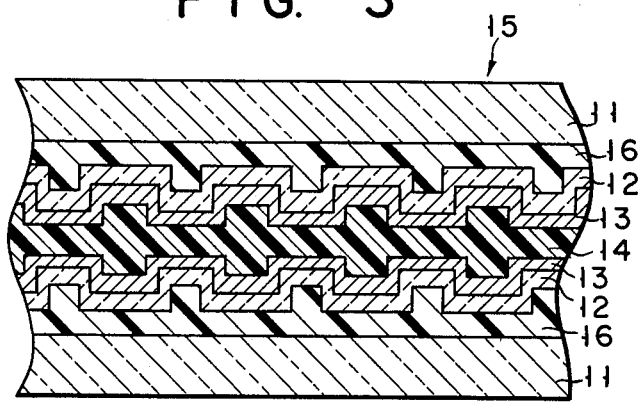

FIG. 3 shows a modification of the second embodiment. In this case, an indented layer 16, i.e., layer with patterned surface, is formed between the substrate 11 and the protective layer 12. The layer 16 is provided with signal information or tracking guides, and the recess formed in the patterned surface has a depth of λ/4 or λ/8, "λ" representing the wavelength of a laser beam. The modification shown in FIG. 3 produces effects similar to those produced by the second embodiment shown in FIG. 2. Needless to say, the reference numerals common with FIGS. 2 and 3 denote the same members.

Figure 4:
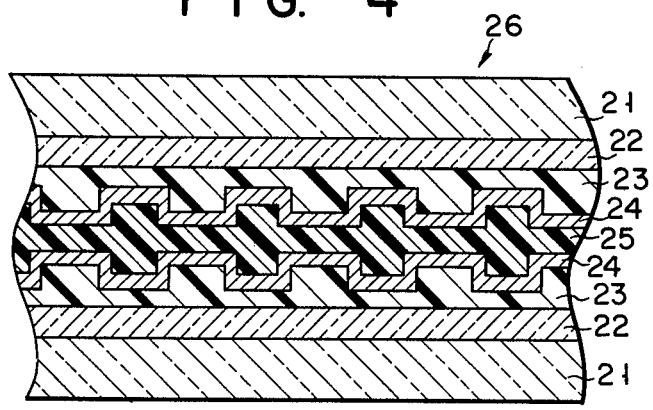

FIG. 4 shows an information recording medium 26 according to a third embodiment of the present invention. It is seen that the medium 26 comprises a pair of transparent substrates 21 each formed of an acrylic resin and having a thickness of 1.0 to 1.5 mm. An intermediate protective layer 22 having a thickness of 3,000 to 4,000 Å and formed of the same material as in the first embodiment is formed on the inner surface of each of the substrate 21. Further, an indented layer 23 with a patterned surface is formed on the protective layer 22. The layer 23 consists of a photo-setting resin and is provided with signal information or tracking guides. Formed on the layer 23 is an optical information recording layer 24 consisting of a thin film of metal such as Te or Al. Further, the clearance between the mutually facing recording layers 24 is filled with an adhesive layer 25 consisting of an epoxy series adhesive and having a thickness of 50 to 300 μm. In other words, the substrates 21 each bearing the protective layer 22, the indented layer 23 and the recording layer 24 are bonded together such that the recording layers 24 are in direct contact with the adhesive layer 25. Naturally, the information recording medium 26 shown in FIG. 4 is of disk shape and is provided in the center with a hole extending through the substrates 21, as in the first embodiment.

In the embodiment of FIG. 4, the intermediate protective layer 22 serves to prevent oxygen or water from entering the recording layer 24 as in the first embodiment. It is important to note that the indented layer 23 is formed between the protective layer 22 and the recording layer 24. In other words, the protective layer 22 is in contact with the flat surface of the indented layer 23. Thus, even if the protective layer 22 is made thicker than the depth of the recess formed on the indented layer 23 in order to enhance the effect produced by the protective layer 22, the recess is not filled with the protective layer 22. Further, the protective layer 22 also plays the role of a binder for increasing the bonding strength between the indented layer 23 and the substrate 21.

Figure 5:
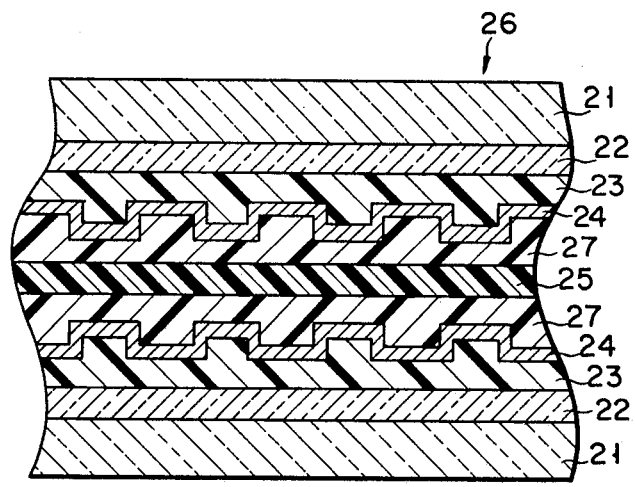

FIG. 5 shows a modification of the third embodiment. In this modification, an intermediate layer 27 having a thickness of 5 to 40 μm is formed between the recording layer 24 and the adhesive layer 25. The intermediate layer 27 is formed by the spinner coating of an organic material such as polystyrene resin. In the bonding step of the substrates 21, flow of the adhesive causes the recording layer 24 to tend to peel off the indented layer 23. But, the intermediate layer 27 serves to prevent the peeling mentioned. Needless to say, the reference numerals common with FIGS. 4 and 5 denote the same members.

Figure 6:
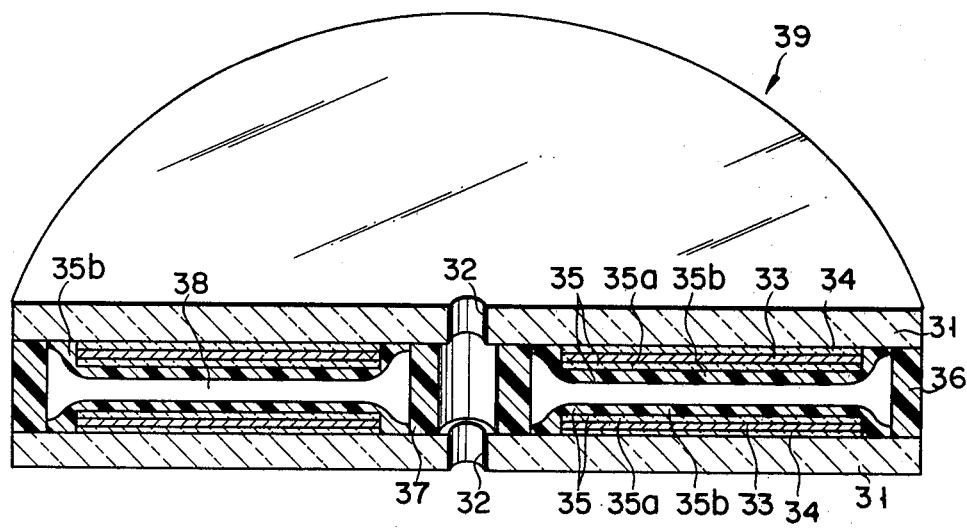

FIG. 6 shows an information recording medium 39 according to a fourth embodiment of the present invention. As seen from the drawing, the medium 39 comprises a pair of transparent substrates 31 each formed of an acrylic resin. A hole 32 extending through the substrates 31 is formed in the center as in the first embodiment. Formed on the inner surface of each of the substrates 31 is an intermediate protective layer 34. Further, an optical information recording layer 33 consisting of an energy-absorbing layer or light reflective layer is formed on the protective layer 34. Still further, a surface protective layer 35 of laminated structure consisting of an inorganic material layer 35a and an organic material layer 35b is formed on the recording layer 33.

As apparent from the drawing, an annular outer spacer 36 and an annular inner spacer 37 are disposed between the substrates 31 so as to provide a clearance 38 between the mutually facing surface protective layers 35. Naturally, the outer spacer 36 extends along the outer periphery of the substrate 31. On the other hand, the inner spacer 37 is located near the center of the substrate 31.

The optical information recording layer 33 should be formed of a thin film of metal such as Te or Al by means of, for example, vacuum vapor deposition. The intermediate protective layer 34 is equal in function and effect to the intermediate protective layer 4 included in the first embodiment. To be brief, the protective layer 34 should be formed of a transparent and dense inorganic material. The inorganic material layer 35a included in the surface protective layer 35 should be about 100 Å thick and should be equal in material to the intermediate protective layer 34. For example, the inorganic material layer 35a may be formed of $SiO_2$. Further, the organic material layer 35b formed on the inorganic material layer 35a may be formed in a thickness of about 30 μm by means of, for example, a spinner coating of polystyrene resin. Besides polystyrene, the organic materials forming the layer 35b include, for example, acrylic resin, polyvinyl chloride, polyvinylidene chloride, polyester, methyl methacrylate resin, polyurethane, epoxy resin, melamine resin and silicone resin.

In the embodiment of FIG. 6, the intermediate protective layer 34 and the inorganic material layer 35a serve to prevent the oxygen and water entering the clearance 38 through the substrate 31 and the spacers 36, 37 from permeating into the recording layer 33. As a result, the recording layer 33 is prevented from an early deterioration. Also, the organic material layer 35b serves to prevent the peeling of the inorganic material layer 35a. In addition, the organic material layer 35b also serves to prevent the permeation of oxygen or water, leading to an enhanced permeation preventing effect of the information recording medium 39. Further, the surface protective layers 35 permit preventing a direct contact of the recording layers 33 even if the substrates 31 are deformed by an external mechanical pressure so as to collapse the clearance 38. Thus, the recording layers 33 are prevented from damage.

Figure 7:
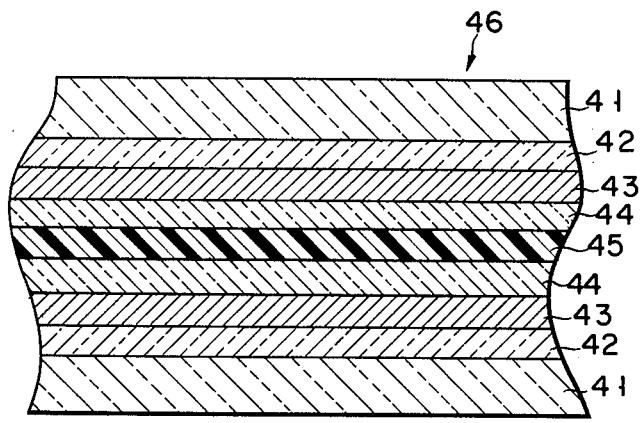

FIG. 7 shows an information recording medium 46 according to a fifth embodiment of the present invention. The medium 46 comprises a pair of transparent substrates 41 each having a thickness of 1.0 to 1.5 mm and formed of acrylic resin. A first intermediate protective layer 42 is formed on the inner surface of each of the substrates 41. Formed on the protective layer 42 is an optical information recording layer 43 consisting of an energy-absorbing layer or light reflective layer. Further, a second intermediate protective layer 44 is formed on the recording layer 43. Still further, the clearance between the mutually facing protective layers 44 is filled with an adhesive layer 45 so as to form the information recording medium 46. Naturally, a hole (not shown) extending through the substrates 41 is made in the center as in the first embodiment.

The first and second intermediate protective layers 42 and 44 should be formed of the same material, i.e., a transparent inorganic material which permits preventing permeation of oxygen or water like the intermediate protective layer included in the first embodiment. The first intermediate protective layer 42 should be formed in a thickness of about 50 to 1,000 Å by means of vacuum vapor deposition or sputtering. On the other hand, the second intermediate protective layer 44 should be about 100 to 3,000 Å thick. Further, the recording layer 43, when formed of Te, should be formed in a thickness of about 500 Å by vacuum vapor deposition.

The adhesive layer 45 is about 50 to 300 μm thick and consists of an epoxy series adhesive (Cemedine 1565, trademark). The recording layer 43 is formed between the first and second intermediate protective layers 42 and 44, with the result that the oxygen or water contained in the atmosphere is prevented from entering the recording layer 43. Also, the ionized impurity atoms contained in the substrate 41 or in the adhesive layer 45 are prevented from migrating into the recording layer 43. It follows that the recording layer 43 is free from early deterioration, pin hole occurrence, etc.

It should be noted that each of the first intermediate protective layer 42, the recording layer 43 and the second intermediate protective layer 44 is formed of an inorganic material. Thus, these three layers can be formed under the same vacuum atmosphere, rendering it possible to form efficiently these three layers in succession. Further, the protective layers 42 and 44 are formed of the same material as mentioned previously. In other words, it suffices to use two different materials for forming the three layers in question, leading to a relatively high manufacturing efficiency and relatively low manufacturing cost of the information recording medium.

An additional merit to be noted is that each of the substrate 41 and the adhesive layer 45 is formed of an organic material. Thus, if the substrate 41 or the adhesive layer 45 is in direct contact with the recording layer 43, the substrate 41 and the adhesive layer 45 tend to be locally deformed by the heat generated from the recording layer 43 in the information recording step. In the embodiment of FIG. 7, however, the first and second protective layers 42 and 44 act as thermal barriers so as to protect the substrate 41 and the adhesive layer 45 from thermal deformation. The protective layers 42 and 44 also serve to moderate the strains caused by water absorption and by the difference in thermal expansion coefficient among the recording medium 43, the substrate 41 and the adhesive layer 45.

Figure 8:
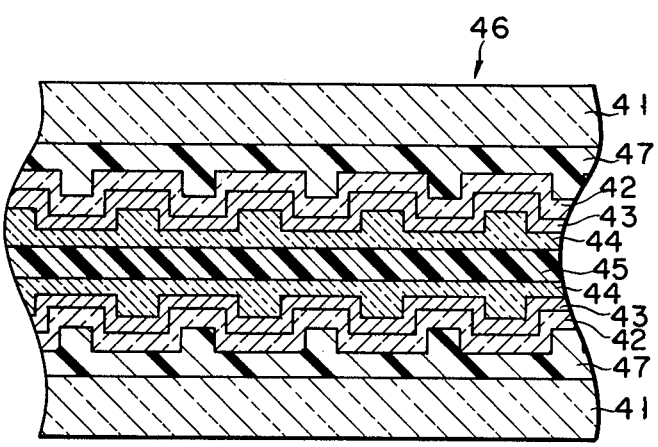

FIG. 8 shows a modification of the fifth embodiment shown in FIG. 7. In this modification, an indented layer 47 formed of an organic material such as a photopolymer and having a patterned surface is provided between the substrate 41 and the first intermediate protective layer 42. The indented layer 47 is provided with signal information or tracking guide. The modification of FIG. 8 produces effects similar to those produced by the embodiment of FIG. 7. Needless to say, the reference numerals common with FIGS. 7 and 8 denote the same members.

Figure 9:
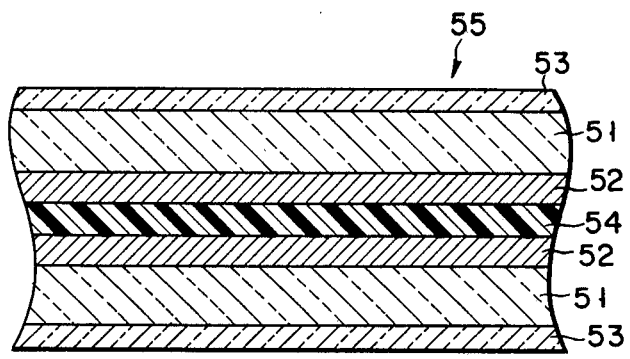

FIG. 9 shows an information recording medium 55 according to a sixth embodiment of the present invention. It is seen that the medium 55 comprises a pair of transparent substrates 51 each formed of acrylic resin. An optical information recording layer 52 consisting of an energy-absorbing layer or light reflective layer is formed on the inner surface of each of the substrates 51. On the other hand, a transparent outer protective layer 53 consisting of an inorganic material which permits preventing the permeation of oxygen or water is formed on the outer surface of each of the substrates 51.

Further, the clearance between the mutually facing recording layers 52 is filled with an adhesive layer 54 so as to provide the information recording medium 55. Of course, a hole (not shown) extending through the substrates 51 is made in the center as in the first embodiment.

In the embodiment of FIG. 9, the outer protective layer 53 serves to prevent the oxygen or water contained in the air from entering the recording layer 52 through the substrate 51. It is important to note that the protective layer 53 can be made sufficiently thick relative to the thickness of the substrate 51, leading to an enhanced effect of preventing the permeation of oxygen or water. Also, the protective layer 53 serves to prevent the outer surface of the substrate 51 from being damaged. If the outer surface of the substrate 51 is damaged, the light is scattered, leading to a reduced sensitivity in the writing step and to a reduced S/N ratio in the read out step. Further, the substrate 51, which is made of acrylic resin, is high in hygroscopicity. Thus, if the outer surface of the substrate 51 is not covered with the protective layer 53, the substrate 51 tends to be swollen because of the moisture absorption and, thus, tends to be bent.

Figure 10:
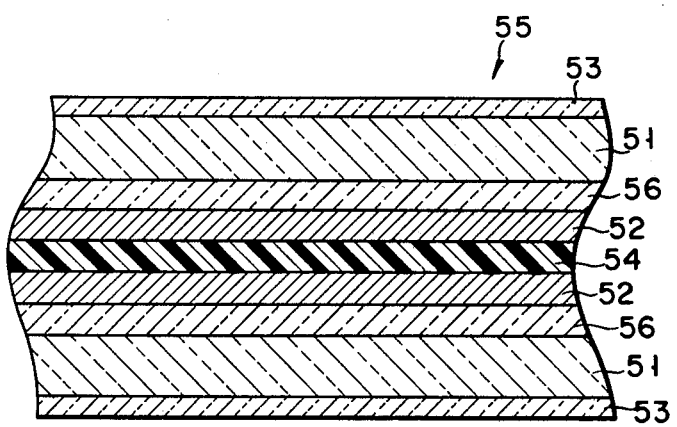

FIG. 10 shows a modification of the sixth embodiment shown in FIG. 9. In this modification, an intermediate protective layer 56 is formed between the substrate 51 and the recording layer 52. The protective layer 56 is formed of a transparent inorganic material like the outer protective layer 53. Specifically, the layer 56 is formed in a thickness of 50 to 500 Å by vacuum vapor deposition or sputtering of, for example, $SiO_2$, SiO, $SnO_2$ or $In_2O_3$. Naturally, the entry of oxygen or water into the recording layer 53 can be prevented more effectively because the recording layer 53 is covered with both the outer and intermediate protective layers 53 and 56. Incidentally, these protective layers can be formed, with the substrate 51 kept put in a vacuum vessel, with the result that the manufacturing efficiency of the information recording medium 55 is not lowered.

Figure 11:
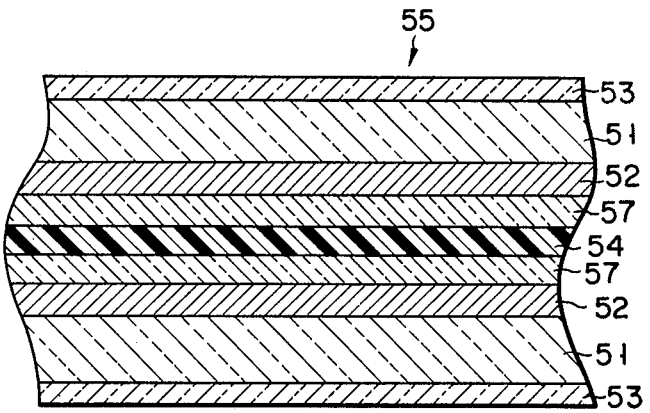
Figure 12:
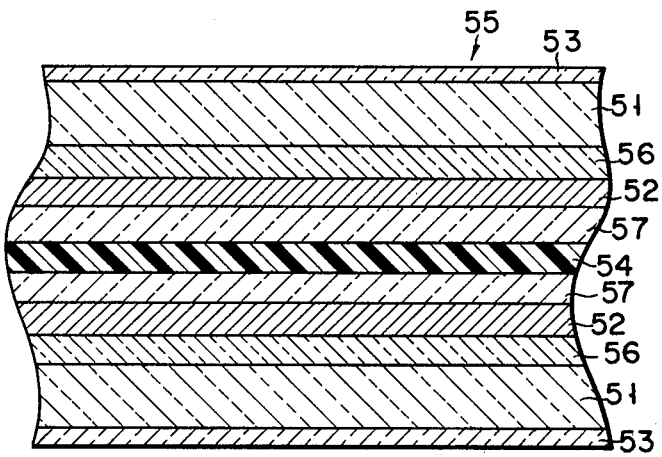

FIGS. 11 and 12 show other modifications of the sixth embodiment. In these modifications, a second intermediate protective layer 57 is formed in a thickness of about 5 to 40 μm by spinner coating of, for example, polystyrene resin between the recording layer 52 and the adhesive layer 54. The second intermediate protective layer 57 serves to prevent the recording layer 52 from peeling off the substrate 51 or the intermediate protective layer 56, said peeling being caused by the flow of adhesive in the bonding step.

Figure 13:
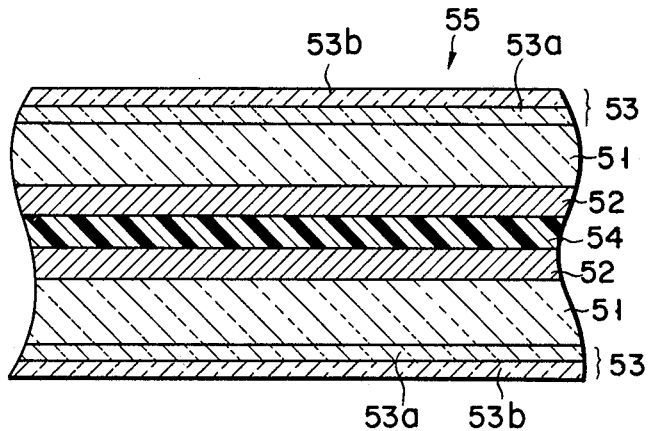

Further, FIG. 13 shows a still another modification of the sixth embodiment. In this modification, the outer protective layer 53 consists of an inorganic material layer 53a and an organic material layer 53b formed on the layer 53a. Of course, the organic material layer 53b serves to protect the inorganic material layer 53a. Needless to say, the reference numerals common with FIGS. 10 to 13 denote the same members.

In the embodiments described above, each of the intermediate protective layer, surface protective layer and outer protective layer is formed of an inorganic material which permits preventing permeation of oxygen or water. But, it is also possible to have the protective layer formed of an organic material of low moisture transmittance, e.g. synthetic resin like polypropylene, polyethylene or polyvinylidene chloride.

What is claimed is:

1. An information recording medium, comprising a pair of disk-shaped transparent substrates disposed apart from each other; intermediate transparent protective layers each formed on the inner surface of the substrate; and optical information recording layers each consisting of an energy-absorbing layer or light reflective layer and formed on the intermediate transparent layer.

2. The recording medium according to claim 1, wherein a surface protective layer is formed on the optical information recording layer.

3. The recording medium according to claim 2, wherein the surface protective layer consists of an inorganic material layer and an organic material layer formed on the inorganic material layer.

4. The recording medium according to claim 3, wherein the inorganic material layer included in the surface protective layer is equal in material to the intermediate protective layer.

5. The recording medium according to claim 3, wherein the organic material layer is formed of a material selected from the group consisting of polystyrene, acrylic resin, polyvinyl chloride, polyvinylidene chloride, polyester, methyl methacrylate resin, polyurethane, epoxy resin, melamine resin, and silicone resin.

6. The recording medium according to claim 1, wherein the disk-shaped substrates are held apart from each other by an annular outer spacer and an annular inner spacer smaller in diameter than the outer spacer.

7. The recording medium according to claim 1, wherein the substrates have a thickness of 1.0 to 1.5 mm.

8. An information recording medium, comprising a pair of disk-shaped transparent substrates disposed apart from each other; intermediate protective layers each formed on the inner surface of the substrate; optical information recording layers each consisting of an energy-absorbing layer or light reflective layer and formed on the intermediate protective layer, and an adhesive layer filling the clearance between the mutually facing information recording layers for the bonding purpose.

9. The recording medium according to claim 1 or 8, wherein the intermediate protective layer is formed of an inorganic material selected from the group consisting of oxides of Zn, Al, Mg, Si, Zr, Ce, In, Ti, Sn, Nb and fluorides of Mg, Ca and Ce.

10. The recording medium according to claim 3, wherein an indented layer provided with signal information or tracking guides is formed between the substrate and the intermediate protective layer.

11. The recording medium according to claim 8, wherein an indented layer provided with signal information or tracking guides is formed between the optical information recording layer and the intermediate protective layer.

12. The recording medium according to claim 11, wherein an intermediate layer consisting of an organic material is formed between the optical information recording layer and the adhesive layer.

13. The recording medium according to claim 8, wherein a second intermediate protective layer is formed between the optical information recording layer and the adhesive layer.

14. The recording medium according to claim 13, wherein an indented layer provided with signal information or tracking guides is formed between the substrate and the intermediate protective layer.

15. The recording medium according to claim 8, wherein the substrates have a thickness of 1.0 to 1.5 mm.

16. The recording medium according to claim 8, wherein the adhesive layer has a thickness of 50 to 300 $\mu$m.

17. An information recording medium, comprising a pair of disk-shaped transparent substrates disposed apart from each other; optical information recording layers each consisting of an energy-absorbing layer or light reflective layer and formed on the inner surface of the substrate; an adhesive layer filling the clearance between the mutually facing optical information recording layers for the bonding purpose; and outer transparent protective layers each formed on the outer surface of the substrate.

18. The recording medium according to claim 17, wherein the outer protective layer is formed of an inorganic material selected from the group consisting of oxides of Zn, Al, Mg, Si, Zr, Ce, In, Ti, Sn, Nb fluorides of Mg, Ca and Ce.

19. The recording medium according to claim 17, wherein the substrates have a thickness of 1.0 to 1.5 mm.

20. The recording medium according to claim 17, wherein the adhesive layer has a thickness of 50 to 300 $\mu$m.

* * * * *